United States Patent
Yang et al.

(10) Patent No.: US 12,502,962 B2
(45) Date of Patent: Dec. 23, 2025

(54) CONTEXTUAL VEHICLE CONTROL WITH VISUAL REPRESENTATION

(71) Applicant: Atieva, Inc., Newark, CA (US)

(72) Inventors: Yunwei Yang, Union City, CA (US); Aman Bhatnagar, Union City, CA (US)

(73) Assignee: Atieva, Inc., Newark, CA (US)

( * ) Notice: Subject to any disclaimer, the term of this patent is extended or adjusted under 35 U.S.C. 154(b) by 50 days.

(21) Appl. No.: 18/703,964

(22) PCT Filed: Oct. 21, 2022

(86) PCT No.: PCT/US2022/078513
§ 371 (c)(1),
(2) Date: Apr. 23, 2024

(87) PCT Pub. No.: WO2023/076841
PCT Pub. Date: May 4, 2023

(65) Prior Publication Data
US 2025/0001864 A1   Jan. 2, 2025

Related U.S. Application Data

(60) Provisional application No. 63/262,981, filed on Oct. 25, 2021.

(51) Int. Cl.
*B60K 35/22* (2024.01)
*B60K 35/10* (2024.01)
(Continued)

(52) U.S. Cl.
CPC .............. *B60K 35/28* (2024.01); *B60K 35/10* (2024.01); *B60K 35/21* (2024.01); *B60K 35/22* (2024.01);
(Continued)

(58) Field of Classification Search
CPC ........ B60K 35/10; B60K 35/20; B60K 35/21; B60K 35/22; B60K 35/28; B60K 35/60;
(Continued)

(56) References Cited

U.S. PATENT DOCUMENTS 12,084,048 B2 * 9/2024 Heirung ............... B60W 30/16
2013/0135476 A1   5/2013 Schofield et al.
(Continued)

FOREIGN PATENT DOCUMENTS

CN   103946732 B   6/2019
DE   102005036923 A1   2/2007
(Continued)

OTHER PUBLICATIONS

International Search Report and Written Opinion for PCT Application No. PCT/US2022/078513, mailed on Feb. 1, 2023, 8 pages.
(Continued)

*Primary Examiner* — Erick R Solis
(74) *Attorney, Agent, or Firm* — Brake Hughes Bellermann LLP

(57) ABSTRACT

A computer-based method comprises: receiving, in a vehicle, a sensor output from a sensor, the sensor output reflecting a circumstance external to the vehicle; identifying a physical control device of the vehicle as being implicated by the sensor output, the physical control device configured for generating an input that controls vehicle operation; presenting, on a display device of the vehicle and in response to the sensor output, a visual representation of the physical control device, the visual representation indicating how to actuate the physical control device to generate the input; and ceasing to present the visual representation in response to a predefined event.

16 Claims, 8 Drawing Sheets

(51) Int. Cl.
*B60K 35/21* (2024.01)
*B60K 35/28* (2024.01)
*B60K 35/60* (2024.01)
*B60K 35/80* (2024.01)

(52) U.S. Cl.
CPC .............. *B60K 35/60* (2024.01); *B60K 35/80* (2024.01); *B60K 2360/128* (2024.01); *B60K 2360/21* (2024.01)

(58) Field of Classification Search
CPC ................ B60K 35/80; B60K 2360/21; B60K 2360/128; B60K 2360/1868; B60K 2360/1876
See application file for complete search history.

(56) References Cited

U.S. PATENT DOCUMENTS

| | | |
|---|---|---|
| 2014/0250395 A1 | 9/2014 | Tanaka |
| 2016/0077688 A1 | 3/2016 | Shim |
| 2016/0325740 A1 | 11/2016 | Onica |
| 2017/0212633 A1 | 7/2017 | You et al. |
| 2019/0174098 A1 | 6/2019 | Smith et al. |
| 2020/0167045 A1* | 5/2020 | Takahashi .............. B60Q 9/008 |
| 2022/0144267 A1* | 5/2022 | Fu .......................... B60K 35/22 |
| 2024/0190455 A1* | 6/2024 | Zarringhalam ..... B60W 30/182 |
| 2025/0042425 A1* | 2/2025 | Jerg ....................... B60K 35/10 |

FOREIGN PATENT DOCUMENTS

| | | |
|---|---|---|
| DE | 102013213039 A1 | 1/2015 |
| GB | 2517792 A | 3/2015 |
| WO | 2011028686 A1 | 3/2011 |
| WO | 2020230467 A1 | 11/2020 |

OTHER PUBLICATIONS

Extended European Search Report for European Application No. 22888402.9, mailed Jul. 24, 2025, 20 pages.

* cited by examiner

CONTEXTUAL VEHICLE CONTROL WITH VISUAL REPRESENTATION

CROSS-REFERENCE TO RELATED APPLICATION

This application claims is a 35 U.S.C. § 371 National Phase Entry Application from PCT Application No. PCT/US2022/078513, filed on Oct. 21, 2022, entitled "CONTEXTUAL VEHICLE CONTROL WITH VISUAL REPRESENTATION", and designating the U.S., which claims priority to U.S. Provisional Patent Application No. 63/262,981, filed on Oct. 25, 2021, and entitled "CONTEXTUAL VEHICLE CONTROL WITH VISUAL REPRESENTATION," the disclosures of which are incorporated by reference herein in their entireties.

TECHNICAL FIELD

This document relates to a contextual vehicle control with a visual representation.

BACKGROUND

As new models and types of vehicles are developed, they are provided with features and functions that may not be familiar to the person using the vehicle. While user manuals may be provided, they may not be interactive, and can typically not be accessed while already operating the vehicle in traffic.

SUMMARY

In an aspect, a computer-based method comprises: receiving, in a vehicle, a sensor output from a sensor, the sensor output reflecting a circumstance external to the vehicle; identifying a physical control device of the vehicle as being implicated by the sensor output, the physical control device configured for generating an input that controls vehicle operation; presenting, on a display device of the vehicle and in response to the sensor output, a visual representation of the physical control device, the visual representation indicating how to actuate the physical control device to generate the input; and ceasing to present the visual representation in response to a predefined event.

Implementations can include any or all of the following features. The physical control device includes a moveable component for generating the input, and wherein presenting the visual representation comprises animating the moveable component. The physical control device is a toggle on a steering wheel of the vehicle. The physical control device includes a button for generating the input, and wherein presenting the visual representation comprises highlighting the button. The sensor output is generated by a camera on the vehicle. The sensor output reflects a traffic sign. The sensor output is generated by a proximity sensor on the vehicle. The sensor output reflects a traffic drive-off event. The predefined event comprises actuation of the physical control device to generate the input. The predefined event comprises expiration of a predefined time. The computer-based method further comprises presenting, in response to the sensor output, a countdown timer on the display device. The computer-based method further comprises presenting, in response to the expiration of the predefined time, an alert message on the display device. The predefined event comprises that the circumstance no longer applies to the vehicle operation.

BRIEF DESCRIPTION OF DRAWINGS

Like reference symbols in the various drawings indicate like elements.

DETAILED DESCRIPTION

Figure 1:
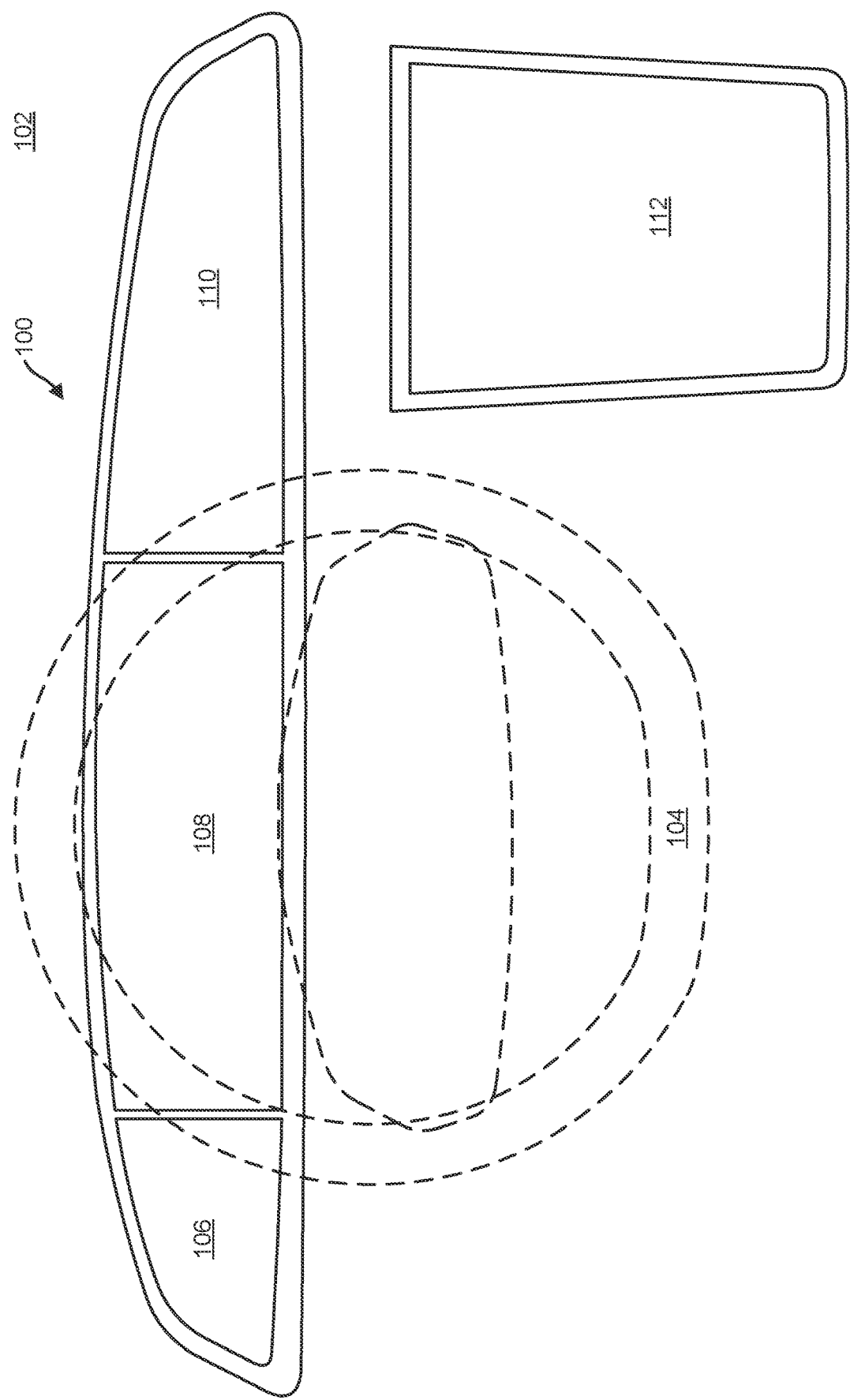
FIG. 1 shows an example of an instrument panel of a vehicle.

This document describes examples of systems and techniques providing a contextual vehicle control with a visual representation. As used herein, a physical control device of a vehicle can be referred to as contextual because it is implicated by particular circumstances of the vehicle operation. The visual representation, moreover, can be presented in a context that implicates the physical control device (e.g., when actuating the device will generate an input that changes the vehicle's mode of operation in a particular way).

Examples described herein refer to a vehicle. As used herein, a vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. A vehicle can be powered by one or more types of power sources. In some implementations, a vehicle is powered solely by electricity, or can use one or more other energy sources in addition to electricity, to name just a few examples.

Examples herein refer to display devices. A display device visually outputs a graphical user interface for one or more computer devices. A display device can operate according to any of multiple display technologies used for presenting computer-based information. A display device can include a liquid crystal display (LCD), a light-emitting diode (LED) display, and/or a plasma display, to name just a few examples. A display device can be configured for receiving input for the computer device(s). In some implementations, a display device can feature one or more types of technology for detecting contact with, or proximity to, the screen by a user's hand or an implement such as a stylus. A display device can operate according to any of multiple touch-detecting, or gesture-recognizing, technologies. A display device can include a resistive touchscreen, a capacitive touchscreen, and/or a touchscreen based on optical imaging, to name just a few examples. A display device can have any of multiple shapes. In some implementations, a display device has a quadrilateral shape (e.g., rectangular), or a non-polygonal shape, to name just a few examples. A display device can have a substantially flat form factor (e.g., the screen is essentially planar), or a non-flat form factor (e.g., the screen is curved according to one or more radiuses.) Two or more display devices can be positioned according to any of multiple spatial relationships with regard to each other. One display device can be placed substantially above another display device in a vertical direction. One display device can be placed substantially to the side of another display device in a horizontal direction. One display device can be placed diagonally from another display device in any direction. Two or more display devices can be positioned so as to face in a common direction. Two or more display devices can be positioned so as to face in different directions from each other.

FIG. 1 shows an example of an instrument panel 100 of a vehicle 102. The vehicle 102 is mostly omitted in the present illustrations for simplicity. The vehicle 102 includes a steering wheel 104 (here shown in phantom for clarity), that can be used in connection with, or independently of, one or more controls or functions available at the instrument panel 100. In some implementations, the steering wheel 104 can include one or more buttons, toggles, scroll wheels, or other physical control devices by which the driver can make at least one input. The instrument panel 100 can be used in combination with one or more other examples described elsewhere herein.

The instrument panel 100 includes a display device 106 here positioned somewhat to the left of the steering wheel 104. The instrument panel 100 includes a display device 108 here positioned essentially behind the steering wheel 104. The instrument panel 100 includes a display device 110 here positioned somewhat to the right of the steering wheel 104. The display device 110 can be horizontally aligned with an instrument cluster in the vehicle 102. For example, the instrument cluster can include at least the display device 108. The instrument panel 100 includes a display device 112 here positioned lower than (e.g., essentially vertically below) the display device 110. The display device 112 is considered to be positioned in the instrument panel 100. For example, the display device 112 can be positioned lower in the same physical housing in which the display devices 106, 108, and 110 are mounted. A visual representation shown or mentioned herein can be presented on one or more of the display devices 106, 108, 110, or 112.

Figure 2:
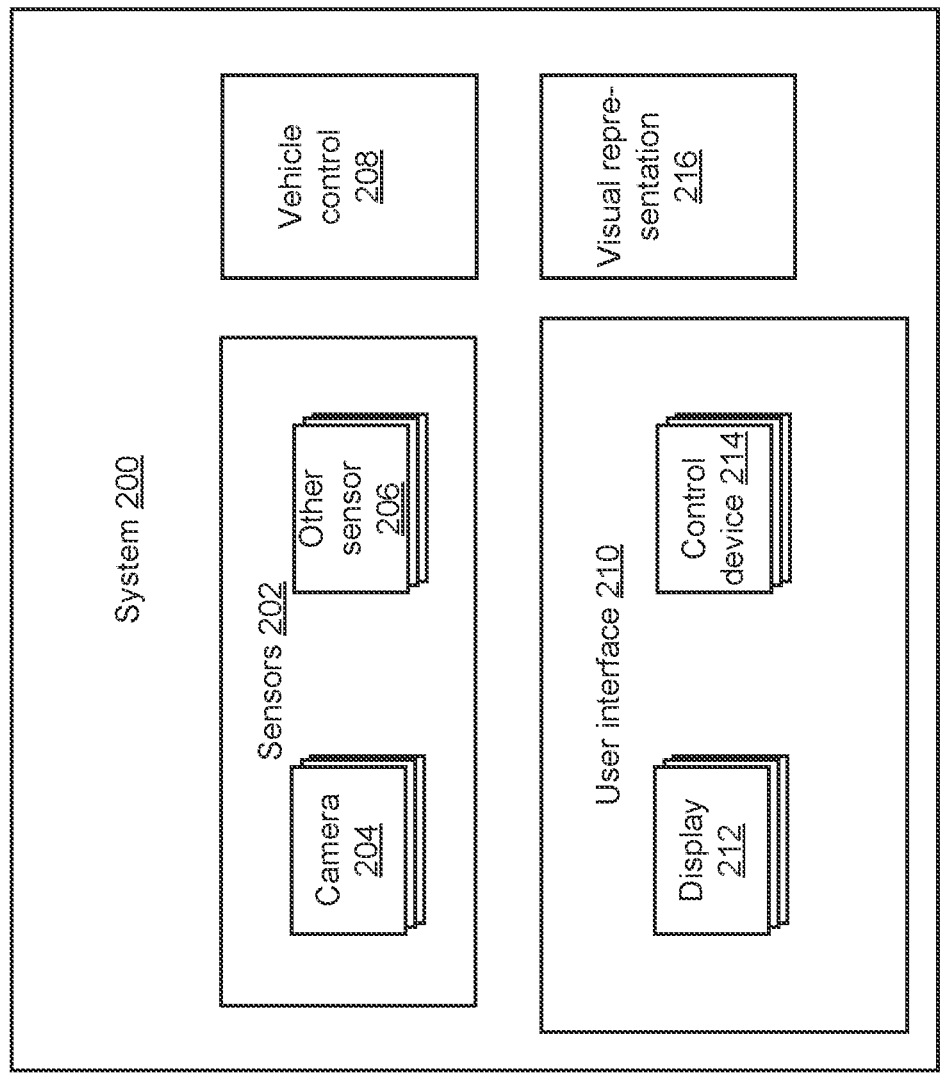
FIG. 2 shows an example of a system.

FIG. 2 shows an example of a system 200. The system 200 can be used in combination with one or more other examples described elsewhere herein. The system 200 can include sensors 202. The sensors 202 can include one or more cameras 204. The cameras 204 can be positioned on or within the vehicle and can capture internal and/or external views. The sensors 202 can include one or more other sensors 206. In some implementations, the other sensor(s) 206 can include at least one proximity sensor and/or any other type of sensor. In some implementations, a proximity sensor can generate sensor output regarding presence of an obstacle in the vehicle surroundings. For example, the sensor output can include information reflecting a distance from the obstacle to the vehicle (e.g., to a nearest portion of the vehicle).

The system 200 includes a vehicle control component 208 that receives output from some or all of the sensors 202. In some implementations, the vehicle control component 208 can automatically control the motion of the vehicle and serve as an advanced driver-assistance system (ADAS) for the vehicle. For example, the vehicle control component 208 can detect road signs near the vehicle and perform one or more operations in response. As another example, the vehicle control component 208 can partially or fully drive the vehicle and in so doing detect and respond to obstacles relative to the vehicle.

The system 200 includes a user interface 210 that can include multiple display devices 212 and multiple physical control devices 214. The display devices 212 can correspond to some or all of the display devices 106, 108, 110, and 112 (FIG. 1). The physical control devices 214 can be configured for generating inputs that control various aspects of vehicle operation.

The system 200 includes a visual representation component 216 for one or more visual representations for presentation on any of the display devices 212. In some implementations, the visual representation component 216 provides an animation corresponding to a moveable component of a physical control device. For example, the animation can indicate, in a context that implicates the physical control device, how to actuate the physical control device to generate an input.

Figure 3:
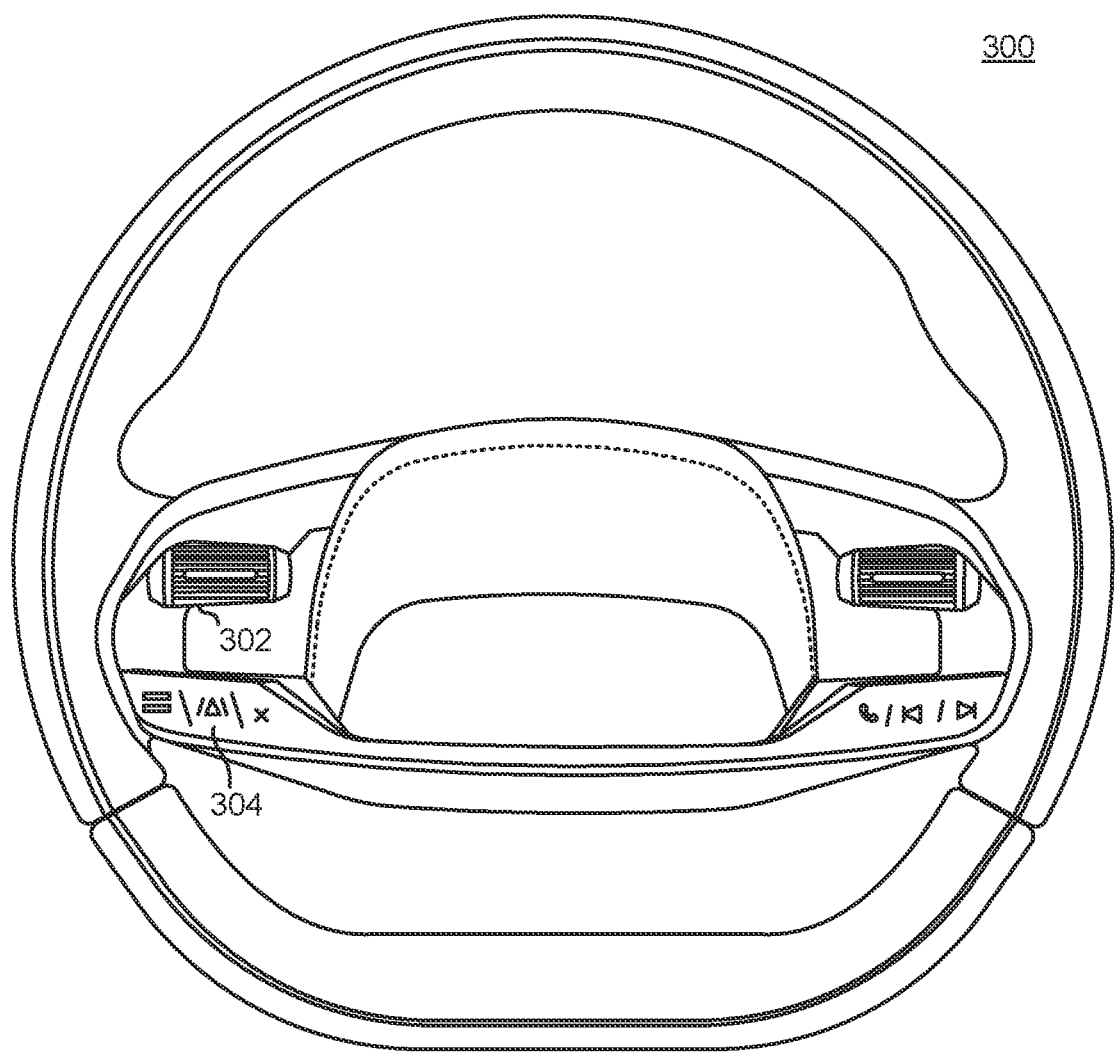
FIG. 3 shows an example of a steering wheel with input controls.

FIG. 3 shows an example of a steering wheel 300 with input controls. The steering wheel 300 can be used in combination with one or more other examples described elsewhere herein. The steering wheel 300 has physical control devices 302 and 304. Either or both of the physical control devices 302 and 304 can include a moveable component and can be used for generating inputs that control various aspects of vehicle operation. For example, the physical control device 302 can include a rotatable element that can be rotated (e.g., using one's thumb) about an axis that is essentially radial to the circumference of the steering wheel 300. As another example, the physical control device 304 can include one or more physical buttons.

Figure 4:
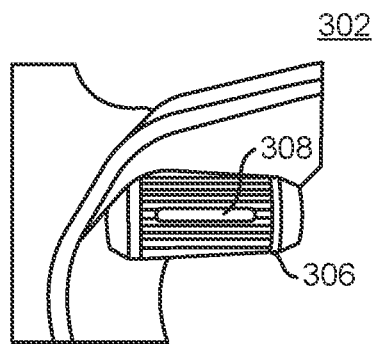
FIG. 4 shows the toggle control of FIG. 3.

FIG. 4 shows the toggle control of FIG. 3. Here, only a portion of the steering wheel is shown for clarity. The physical control device 302 includes a barrel 306 that is rotatably mounted to an axis fixed relative to the steering wheel. The barrel 306 can have cylindrical, conical, or frustoconical shape, to name just a few examples. The barrel 306 can have a structured surface for improved grip and/or tactile experience. Rotation of the barrel in either direction about the axis can generate one or more inputs to the vehicle. The physical control device 302 can include a button 308. The button 308 can operate a switch to generate one or more inputs to the vehicle.

Figure 5A:
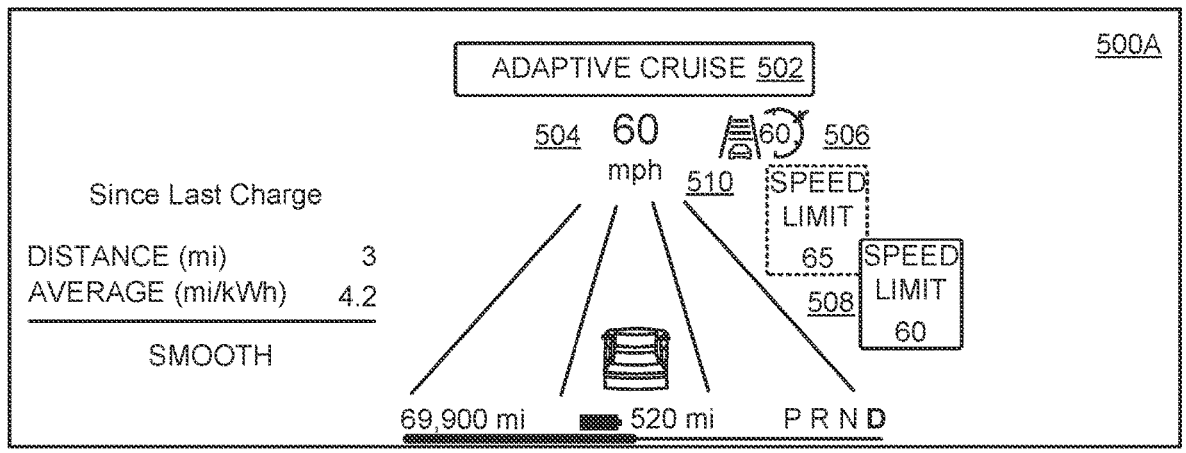
FIGS. 5A-5C show examples of presentations on a display device relating to updating a cruise control speed.
Figure 5B:
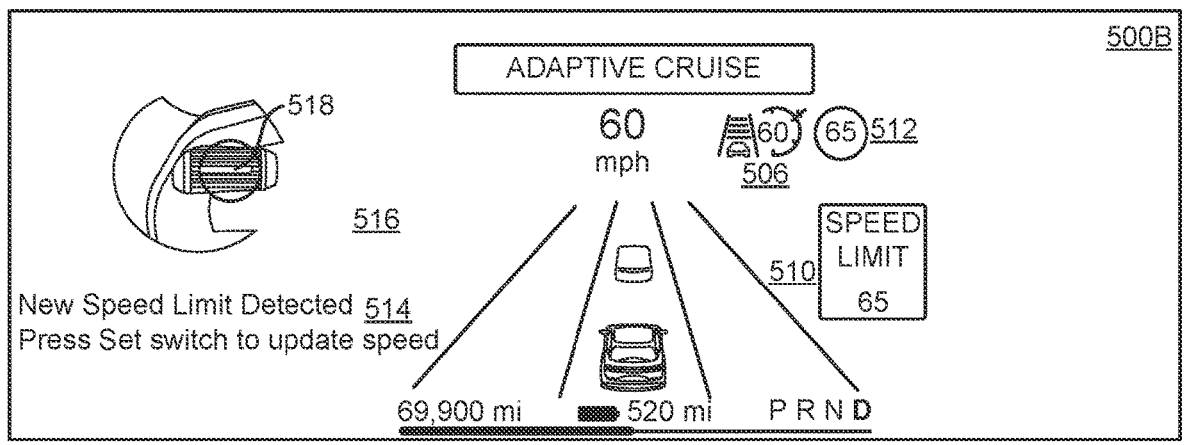
Figure 5C:
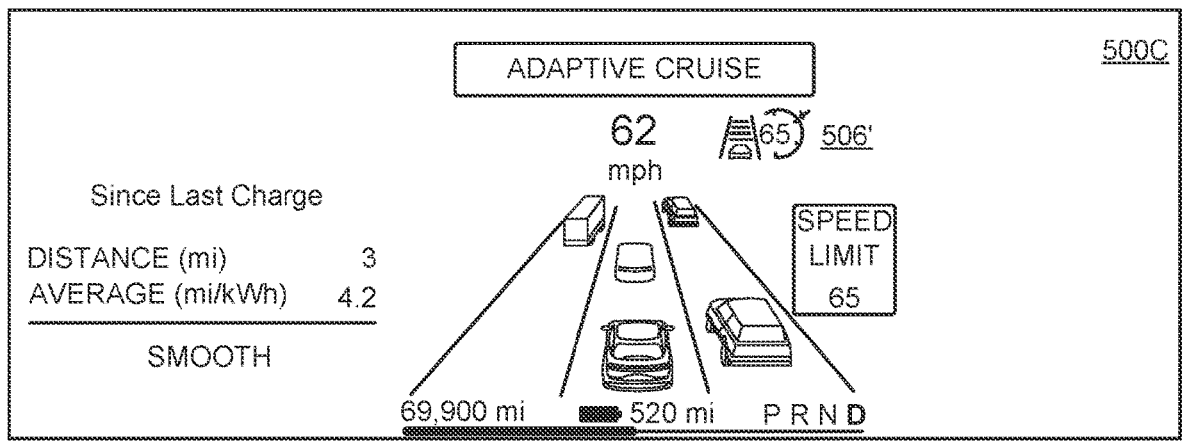

FIGS. 5A-5C show examples of presentations 500A-500C on a display device relating to updating a cruise control speed. Any of the presentations 500A-500C can be presented on one or more of the display devices 106, 108, 110, and 112 (FIG. 1). In presentation 500A, a sign 502 indicates that adaptive cruise control is currently being performed. For example, adaptive cruise control can be performed by ADAS in order to maintain at least a predefined minimum distance to the vehicle ahead of one's own vehicle, while not exceeding a set speed of the adaptive cruise control. A number 504 in the presentation 500A indicates that the vehicle is currently traveling at a speed of 60 miles per hour (mph). A symbol 506 currently includes the number "60" to indicate that the set speed of the adaptive cruise control is 60 mph. A symbol 508 represents a speed limit of 60 mph. For example, a camera of the vehicle has detected a physical road sign of that speed limit; as such, 60 mph is the currently applicable speed limit as determined by the vehicle.

A symbol 510, here somewhat obscured by the symbol 508, represents an upcoming speed limit of 65 mph. For example, a camera of the vehicle has detected a physical road sign of that (higher) speed limit further up the road. That is, the symbol 510 indicates that a sensor of the vehicle (e.g., a camera) has detected a circumstance external to the vehicle (e.g., that there is a speed limit sign up ahead). However, at the moment depicted by the presentation 500A, the vehicle has not yet traveled to the point where the higher speed limit begins to apply.

In presentation 500B, the vehicle will inform the user about the increased speed limit that the vehicle has detected, and about the possibility of increasing the set speed of the adaptive cruise control. A symbol 512 is presented adjacent the symbol 506. The symbol 512 includes the number "65" to check whether the user wishes to change the set speed of the adaptive cruise control to 65 mph. That is, this number is chosen based on the new speed limit according to the newly detected road sign represented by the symbol 510.

The presentation 500B can include a message 514 regarding the possibility of increasing the set speed of the adaptive cruise control. In some implementations, the message 514 can prompt the user to "Press Set switch" if the user wishes to change the set speed. For example, this switch can correspond to the button 308 (FIG. 4). The presentation 500B can also or instead include a visual representation 516. The visual representation 516 represents the physical control device identified as being implicated by the sensor output. For example, detection of a changed speed limit can relate to the possibility of changing the set speed of the adaptive cruise control; as such, the physical control device(s) by which the set speed can be changed can be said to be implicated by such sensor output. The visual representation 516 includes an image of at least part of the physical control device 302 (FIG. 4). In some implementations, the visual representation 516 can highlight a button representation 518 that corresponds to the button 308 (FIG. 4). As such, the visual representation 516 can indicate how to actuate the physical control device 302 (FIG. 4) to generate the input.

The symbol 512 can continue to be presented for a predefined time unless a predefined event occurs. In some implementations, a countdown timer can be presented in the presentation 500B. For example, a circle surrounding the number of the symbol 512 can gradually disappear in a clockwise fashion until the timer runs out. If the user does not change the set speed of the adaptive cruise control (e.g., before the predefined time expires), the vehicle can continue to present the symbol 506 with the appearance it has in the presentations 500A-500B. In some implementations, the predefined event can comprise that the circumstance no longer applies to the vehicle operation. For example, assume that in FIG. 5B the user does not change the set speed before a new speed limit sign, this one for 60 mph, is detected. Then the current set speed (which continued to be 60 mph in this example) matches the newly detected applicable speed limit, and the system can cease to present the symbol 512. The situation can then essentially correspond to the scenario that exists at the beginning of the presentation 500A.

However, if the user does change the set speed of the adaptive cruise control (e.g., by pressing the button 308 (FIG. 4), the vehicle can update the appearance of the symbol 506. In the presentation 500C, a symbol 506' currently includes the number "65" to indicate that the set speed of the adaptive cruise control is 65 mph.

Figure 6A:
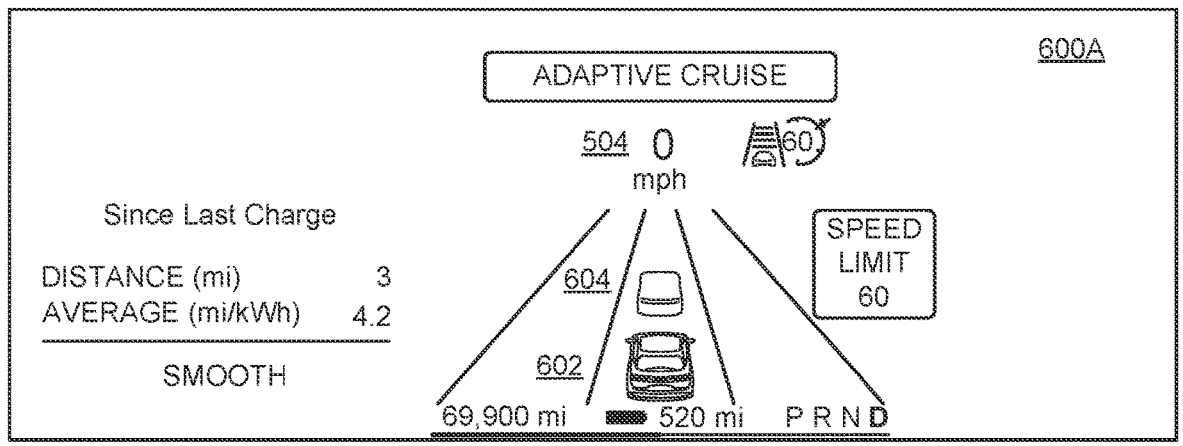
FIGS. 6A-6C show examples of presentations on a display device relating to resuming vehicle motion after a stop in traffic.
Figure 6B:
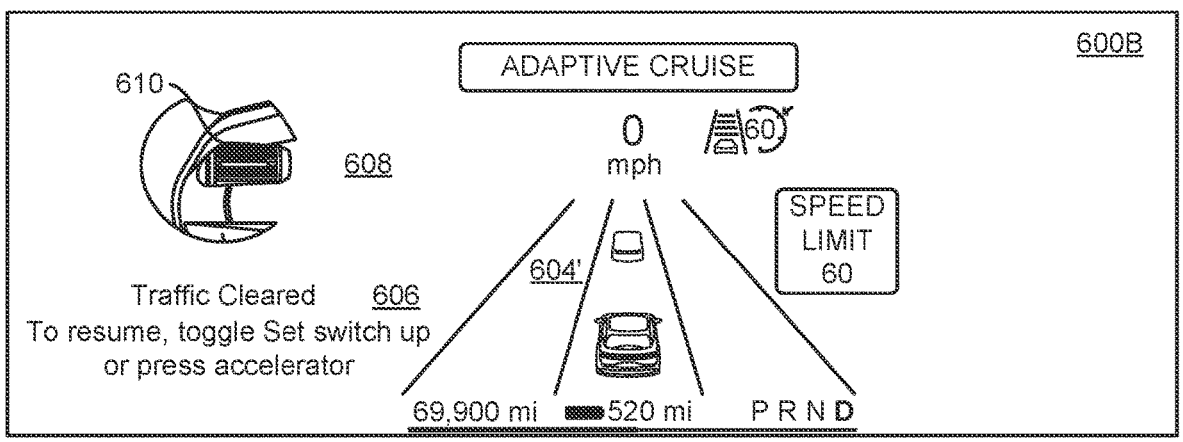
Figure 6C:
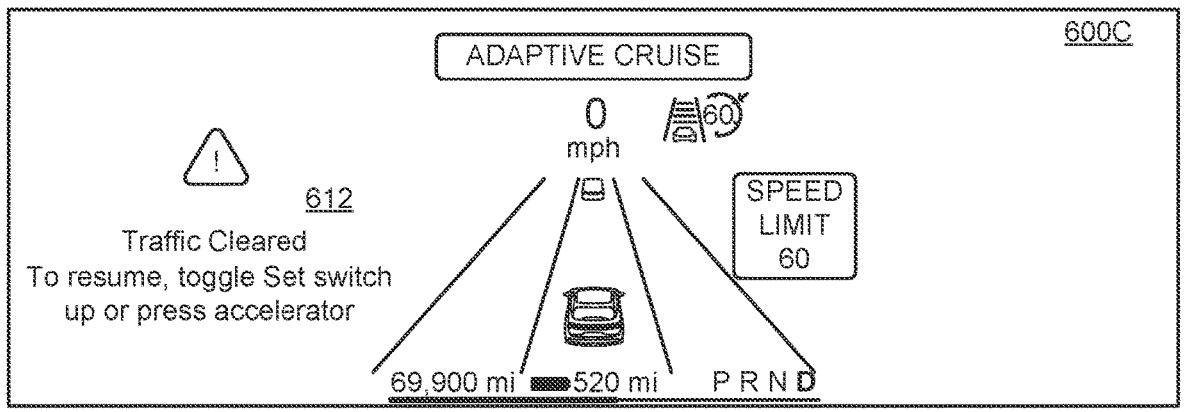

FIGS. 6A-6C show examples of presentations 600A-600C on a display device relating to resuming vehicle motion after a stop in traffic. Any of the presentations 600A-600C can be presented on one or more of the display devices 106, 108, 110, and 112 (FIG. 1). In presentation 600A, a vehicle representation 602 corresponds to the vehicle in which the presentations 600A-600C are being generated (sometimes referred to as the "ego vehicle"). A vehicle representation 604 that is in front of the vehicle representation 602 corresponds to another vehicle that is in front of the ego vehicle. The number 504 in the presentation 600A reads "0" as an indication that the ego vehicle is currently not moving. For example, the ego vehicle is stopped in traffic behind the vehicle corresponding to the vehicle representation 604, which is also stationary. Such circumstances can be detected by one or more sensors of the ego vehicle. For example, a proximity sensor can detect that traffic ahead slows down or comes to a stop.

The sensor(s) of the ego vehicle can detect a traffic drive-off event. In some implementations, this corresponds to a situation where the speed of the ego vehicle had automatically been lowered (e.g., by ADAS) to zero due to a stationary vehicle immediately ahead, and then the obstructing vehicle begins to move away from the ego vehicle. The presentation 600B here shows a vehicle representation 604' that has moved forward relative to the depiction in the presentation 600A. That is, the vehicle representation 604' indicates that a sensor of the ego vehicle (e.g., a camera) has detected a circumstance external to the vehicle (e.g., that traffic is driving off).

The presentation 600B can include a message 606 regarding the possibility of resuming the driving by adaptive cruise control after the temporary stop. In some implementations, the message 606 can prompt the user to "toggle Set switch up" if the user wishes to resume the adaptive cruise control. For example, this toggle can correspond to actuating the barrel 306 (FIG. 4). The presentation 600B can also or instead include a visual representation 608. The visual representation 608 represents the physical control device that is implicated by the sensor output. For example, detection of a traffic drive-off event can relate to the possibility of re-engaging or resuming adaptive cruise control; as such, the physical control device(s) by which adaptive cruise control can be engaged can be said to be implicated by such sensor output. The visual representation 608 includes an image of at least part of the physical control device 302 (FIG. 4). In some implementations, the visual representation 608 can animate (e.g., digitally move, or depict as being moved) a barrel representation 610 that corresponds to the barrel 306 (FIG. 4). As such, the visual representation 608 can indicate how to actuate the physical control device 302 (FIG. 4) to generate the input. If the user re-engages or resumes the adaptive cruise control, the system can cease to present the visual representation 608.

However, if the user does not re-engage or resume the adaptive cruise control (e.g., within a predefined time), the system can present an alert message. The presentation 600C shows that an alert 612 is being presented instead of the visual representation 608. For example, the alert 612 can be an elevated prompt to the user compared to the presentation 600B.

Figure 7:
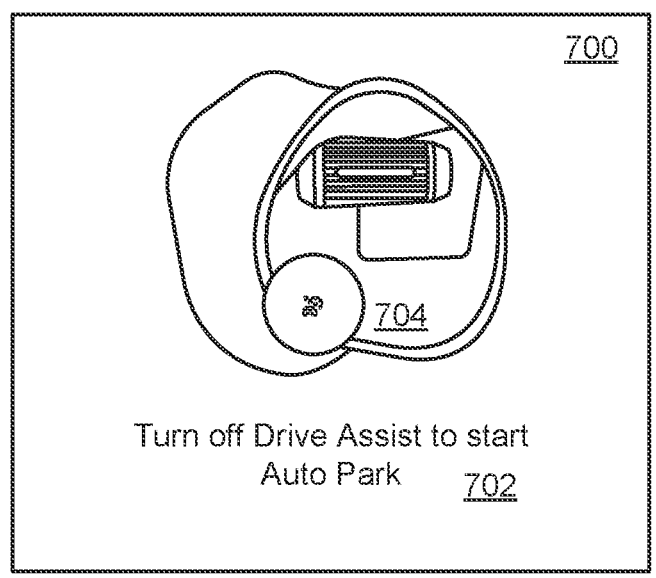
FIG. 7 shows an example of a visual representation that can be presented in a context that involves the button of the steering wheel in FIG. 3.

FIG. 7 shows an example of a visual representation 700 that can be presented in a context that involves the button (e.g., physical control device 304) of the steering wheel in FIG. 3. This situation can be triggered by generation of a sensor output that indicates a circumstance external to the ego vehicle, such as when a parking spot is detected. To check if the user wishes to trigger the ADAS to perform "Auto Park" (e.g., an automated parking maneuver), the vehicle can present a message 702 to this effect. Also or instead, the system can include a highlight 704 in the visual representation 700. For example, the highlight 704 can indicate how to make an input that triggers the automated parking maneuver.

Figure 8:
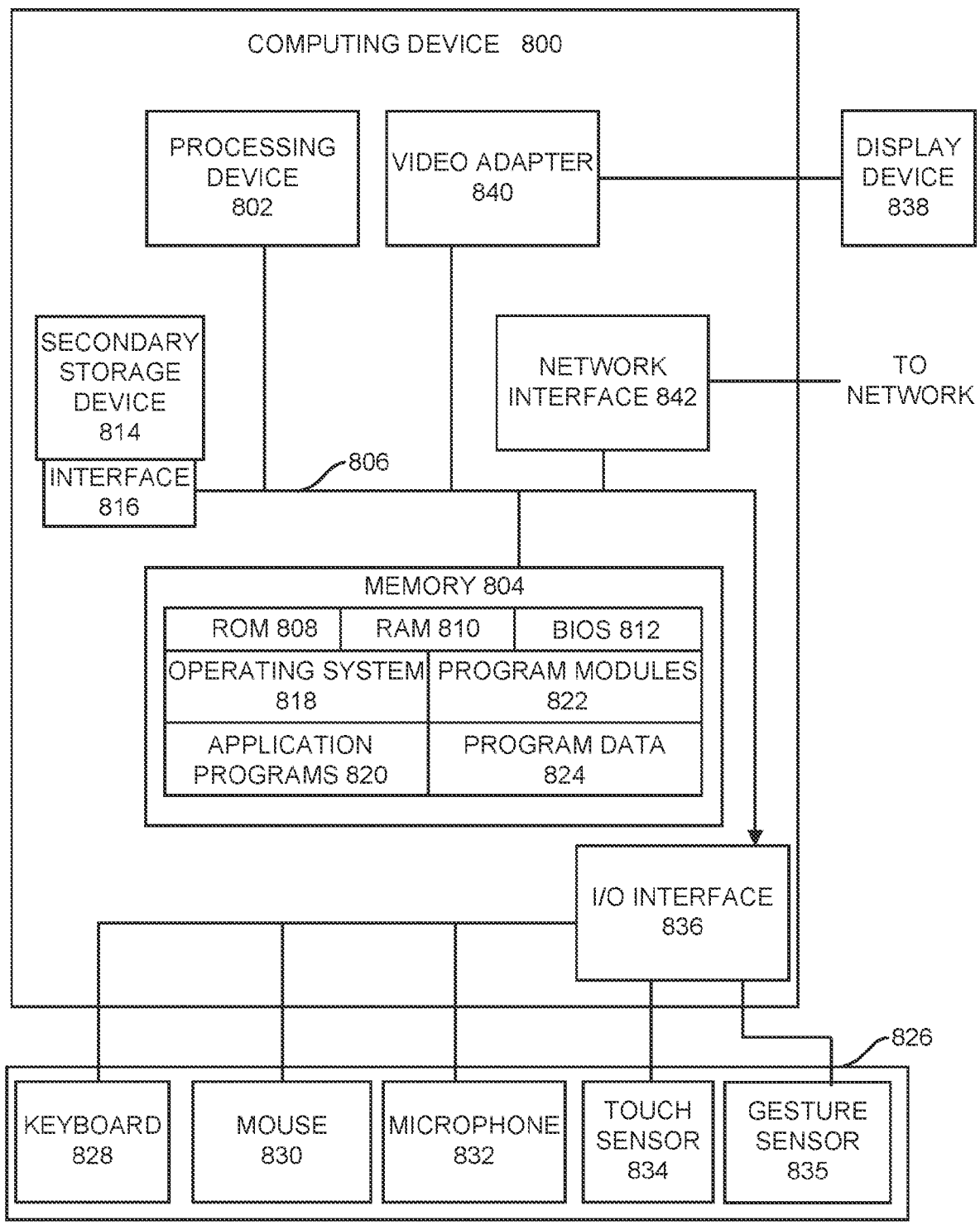
FIG. 8 illustrates an example architecture of a computer system.

FIG. 8 illustrates an example architecture of a computing device 800 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 8 can be used to execute the operating system, application programs, and/or software modules (including the software engines) described herein.

The computing device 800 includes, in some embodiments, at least one processing device 802 (e.g., a processor), such as a central processing unit (CPU). A variety of processing devices are available from a variety of manufacturers, for example, Intel or Advanced Micro Devices. In this example, the computing device 800 also includes a system memory 804, and a system bus 806 that couples various system components including the system memory 804 to the processing device 802. The system bus 806 is one of any number of types of bus structures that can be used, including, but not limited to, a memory bus, or memory controller; a peripheral bus; and a local bus using any of a variety of bus architectures.

Examples of computing devices that can be implemented using the computing device 800 include a desktop computer, a laptop computer, a tablet computer, a mobile computing device (such as a smart phone, a touchpad mobile digital device, or other mobile devices), or other devices configured to process digital instructions.

The system memory 804 includes read only memory 808 and random access memory 810. A basic input/output system 812 containing the basic routines that act to transfer information within computing device 800, such as during start up, can be stored in the read only memory 808.

The computing device 800 also includes a secondary storage device 814 in some embodiments, such as a hard disk drive, for storing digital data. The secondary storage device 814 is connected to the system bus 806 by a secondary storage interface 816. The secondary storage device 814 and its associated computer readable media provide nonvolatile and non-transitory storage of computer readable instructions (including application programs and program modules), data structures, and other data for the computing device 800.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 814 and/or system memory 804, including an operating system 818, one or more application programs 820, other program modules 822 (such as the software engines described herein), and program data 824. The computing device 800 can utilize any suitable operating system.

In some embodiments, a user provides inputs to the computing device 800 through one or more input devices 826. Examples of input devices 826 include a keyboard 828, mouse 830, microphone 832 (e.g., for voice and/or other audio input), touch sensor 834 (such as a touchpad or touch sensitive display), and gesture sensor 835 (e.g., for gestural input). In some implementations, the input device(s) 826 provide detection based on presence, proximity, and/or motion. Other embodiments include other input devices 826. The input devices can be connected to the processing device 802 through an input/output interface 836 that is coupled to the system bus 806. These input devices 826 can be connected by any number of input/output interfaces, such as a parallel port, serial port, game port, or a universal serial bus. Wireless communication between input devices 826 and the input/output interface 836 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 838, such as a monitor, liquid crystal display device, light-emitting diode display device, projector, or touch sensitive display device, is also connected to the system bus 806 via an interface, such as a video adapter 840. In addition to the display device 838, the computing device 800 can include various other peripheral devices (not shown), such as speakers or a printer.

The computing device 800 can be connected to one or more networks through a network interface 842. The network interface 842 can provide for wired and/or wireless communication. In some implementations, the network interface 842 can include one or more antennas for transmitting and/or receiving wireless signals. When used in a local area networking environment or a wide area networking environment (such as the Internet), the network interface 842 can include an Ethernet interface. Other possible embodiments use other communication devices. For example, some embodiments of the computing device 800 include a modem for communicating across the network.

The computing device 800 can include at least some form of computer readable media. Computer readable media includes any available media that can be accessed by the computing device 800. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 800.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 8 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 800 can be characterized as an ADAS computer. For example, the computing device 800 can include one or more components sometimes used for processing tasks that occur in the field of artificial intelligence (AI). The computing device 800 then includes sufficient proceeding power and necessary support architecture for the demands of ADAS or AI in general. For example, the processing device 802 can include a multicore architecture. As another example, the computing device 800 can include one or more co-processors in addition to, or as part of, the processing device 802. In some implementations, at least one hardware accelerator can be coupled to the system bus 806. For example, a graphics processing unit can be used. In some implementations, the computing device 800 can implement a neural network-specific hardware to handle one or more ADAS tasks.

Figure 9:
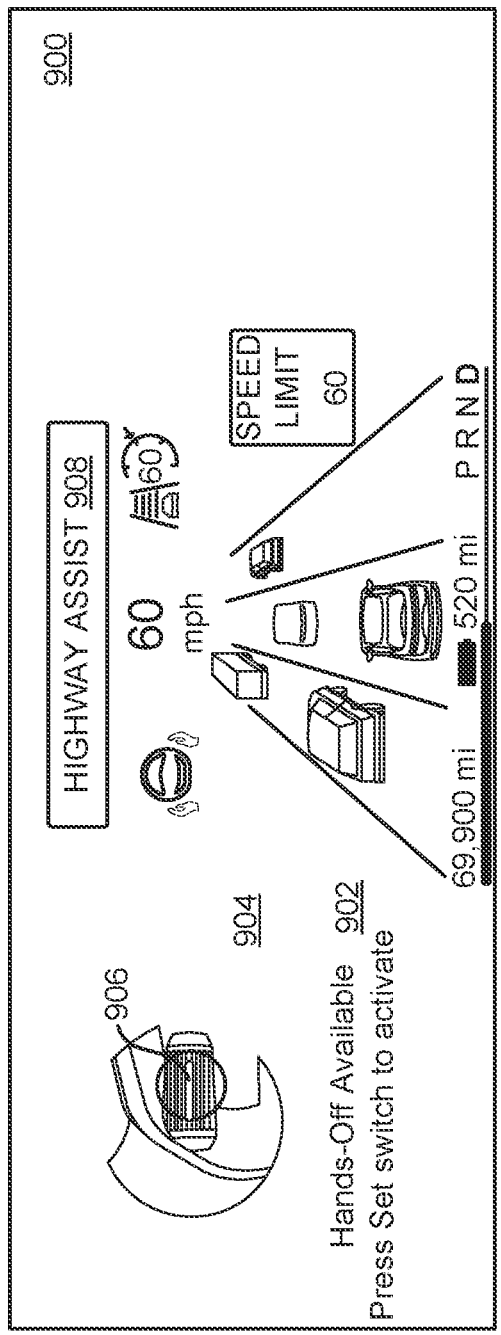
FIG. 9 shows an example of a presentation on a display device relating to hands-off highway assist for a vehicle.

FIG. 9 shows an example of a presentation 900 on a display device relating to hands-off highway assist for a vehicle. The presentation 900 can be presented on one or more of the display devices 106, 108, 110, and 112 (FIG. 1). In the presentation 900, the vehicle will inform the user about the possibility of activating hands-off highway assist, and confirm whether the hands-off highway assist has been activated. The presentation 900 can include a message 902 regarding the possibility of activating hands-off highway assist. In some implementations, the message 902 can inform the user that "Hands-Off [is] Available" and prompt the user to "Press Set switch to activate" if the user wishes to activate hands-off highway assist. For example, this switch can correspond to the button 308 (FIG. 4). The presentation 900 can also or instead include a visual representation 904. The visual representation 904 represents the physical control device identified as being implicated by the sensor output. For example, activation of hands-off highway assist can involve actuating at least one physical control device; as such, the physical control device(s) by which the hands-off highway assist can be activated can be said to be implicated by at least one vehicle sensor indicating that this feature currently should be made available in the vehicle. The visual representation 904 includes an image of at least part of the physical control device 302 (FIG. 4). In some implementations, the visual representation 904 can highlight a button representation 906 that corresponds to the button 308 (FIG. 4). As such, the visual representation 904 can indicate how to actuate the physical control device 302 (FIG. 4) to generate the input. As such, the user is able to activate the hands-off highway assist using the physical control device 302. In the presentation 900, a sign 908 can be presented to indicate that hands-off highway assist has been activated and is currently being performed.

The message 902 and/or visual representation 904 can be removed upon user activation of the feature, or can continue to be presented for a predefined time unless a predefined event occurs. In some implementations, the predefined event can comprise that the vehicle no longer makes the hands-off highway assist available.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-based method comprising:
   receiving, in a vehicle, a sensor output from a sensor, the sensor output reflecting a circumstance external to the vehicle;
   identifying a physical control device of the vehicle as being implicated by the sensor output, the physical control device configured for generating an input that controls vehicle operation;
   presenting, on a display device of the vehicle and in response to the sensor output, a visual representation of the physical control device, the visual representation indicating how to actuate the physical control device to generate the input; and
   ceasing to present the visual representation in response to a predefined event.

2. The computer-based method of claim 1, wherein the physical control device includes a moveable component for generating the input, and wherein presenting the visual representation comprises animating the moveable component.

3. The computer-based method of claim 2, wherein the physical control device is a toggle on a steering wheel of the vehicle.

4. The computer-based method of claim 1, wherein the physical control device includes a button for generating the input, and wherein presenting the visual representation comprises highlighting the button.

5. The computer-based method of claim 1, wherein the sensor output is generated by a camera on the vehicle.

6. The computer-based method of claim 5, wherein the sensor output reflects a traffic sign.

7. The computer-based method of claim 1, wherein the sensor output is generated by a proximity sensor on the vehicle.

8. The computer-based method of claim 7, wherein the sensor output reflects a traffic drive-off event.

9. The computer-based method of claim 1, wherein the predefined event comprises actuation of the physical control device to generate the input.

10. The computer-based method of claim 1, wherein the predefined event comprises expiration of a predefined time.

11. The computer-based method of claim 10, further comprising presenting, in response to the sensor output, a countdown timer on the display device.

12. The computer-based method of claim 10, further comprising presenting, in response to the expiration of the predefined time, an alert message on the display device.

13. The computer-based method of claim 1, wherein the predefined event comprises that the circumstance no longer applies to the vehicle operation.

14. The computer-based method of claim 1, wherein the input that controls the vehicle operation involves updating a speed of the vehicle.

15. The computer-based method of claim 1, wherein the input that controls the vehicle operation involves resuming travel of the vehicle.

16. The computer-based method of claim 1, wherein the input that controls the vehicle operation involves activating hands-off highway assist for the vehicle.

* * * * *